Oct. 14, 1958     E. A. MEYER     2,856,217
ROD END RETAINING CLIP
Filed Nov. 12, 1953
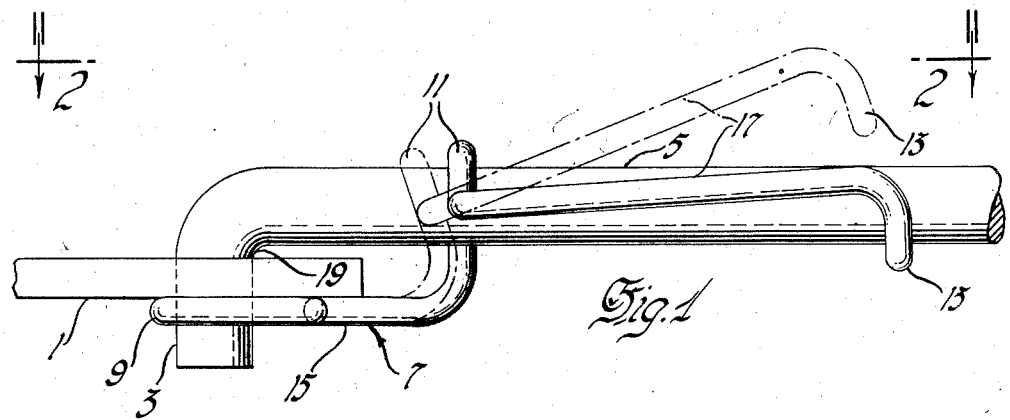
INVENTOR
Engelbert A. Meyer
BY
ATTORNEY

United States Patent Office 2,856,217
Patented Oct. 14, 1958

2,856,217

ROD END RETAINING CLIP

Engelbert A. Meyer, Detroit, Mich., assignor to General Motors Corporation, Detroit, Mich., a corporation of Delaware Application November 12, 1953, Serial No. 391,423

1 Claim. (Cl. 287—93)

This invention relates to fastening devices and more particularly to fastening devices for retaining a lever pivoted on the laterally projecting end of a control rod.

In many mechanical installations where the elements thereof must be moved in relation to one another in order that the installation may operate, there is provided a control rod extending from a movable lever to a dashboard or control panel where a knob or the like is fitted on the end of the rod. Usually the rod has a laterally projecting end on which the lever is pivotally mounted, since such a joint is less expensive than a clevis type joint, for example, where machined parts are required.

In the case of the simpler joint, however, there is presented the problem of retaining the lever on the bent portion of the rod in such a way that lateral looseness and rattling may be eliminated, even after wear of the parts has taken place. Furthermore, the retaining device must be easily constructed and applied, since there would be no advantage in utilizing an inexpensive joint if an expensive retaining device is necessary to make the joint function.

Many forms of retaining devices have been used for this purpose, from the ordinary cotter pin to various types of stamped or wire clips. However, in many instances the retaining device is either lacking in functional requirements or it is too expensive to manufacture or to apply. In the case of wire clips, noticeable defects are that they are not designed so as to apply the necessary forces to the joint with a minimum of material and a minimum number of easily made bends in the wire and so as to be quickly and easily applied to the joint.

It is now proposed to provide a wire clip of the type and for the purpose described above which will to a great extent eliminate the objectional features of clips presently used.

In the drawings:

Figure 1 is a plan view of a control rod and lever assembly secured by a wire clip embodying the invention. The clip is also shown in the partly assembled position by broken lines.

Figure 2 is a side elevational view of the installation shown in Figure 1 when viewed along the line 2—2 in the direction of the arrows.

Figure 3 is a view of the wire clip before application when viewed in the same direction as in Figure 2.

Referring to the drawings in more detail, a lever 1 is pivotally mounted on a laterally projecting end 3 of a rod 5, and the lever 1 is secured to the rod by a wire clip generally designated 7.

The clip 7 comprises a length of spring wire formed to provide a loop 9 at one end thereof, a single open loop or return bend 11 intermediate the ends thereof, and a hook 13 at the other end thereof. Loop 9 and return bend 11 may be joined by a generally straight portion 15, while return bend 11 and hook 13 may be joined by a generally straight portion 17. Portions 15 and 17 may be of any relative lengths, though the clip functions more satisfactorily when portions 15 and 17 are of comparable lengths, and especially when portion 15 is slightly shorter than portion 17. It will be noted that loop 9 and hook 13 are disposed adjacent the open side of return bend 11. It will also be noted that the planes of return bend 11 and hook 13 are disposed in oblique relation to the plane of loop 9 in the normal untensioned condition of clip 7, as best seen in Figure 1.

In assembly, lever 1 is pivotally mounted on the projecting end 3 of rod 5, and loop 9 of the clip is applied over end 3. Referring again to Figure 1, the clip 7 may then be grasped by hook 13 and pulled under and onto the rod 5 so that return bend 11 engages rod 5, as shown by the broken lines. With the return bend 11 serving as an anchor or pivot, hook 13 may then be pulled toward and over rod 5 until hook 13 can be made to engage rod 5 on the side opposite return bend 11. At the same time that hook 13 is thus pulled over rod 5, loop 9 is forced against lever 1 so that lever 1 is urged against bend 19 in the rod. In this manner, rattling of the assembly due to lateral movement of the lever 1 on end 3 is prevented, even after wear of these parts has taken place.

It will be observed from the foregoing drawings and description that there has been provided a wire clip of the type above described which is more easily manufactured and applied and which serves the intended purpose at least as well as the more cumbersome and expensive clips presently employed.

What is claimed is:

In a control linkage system comprising a first control member and a second control member having a laterally extending portion pivotally attached to said first control member and a main body extending in a plane generally parallel to said first control member, a resilient wire clip for biasing said control members together, said clip having an eyelet formed at one end thereof receiving said second control member laterally extending portion and in flat engagement with said first control member, a generally semi-circular anchor bend spaced from said eyelet and extending substantially normal to said control members and having an inner surface engaging said second control member on a side opposite said eyelet, a substantially semi-circular hook formed at the other end of said clip and extending substantially parallel to said anchor bend and engaging said second control member on a side adjacent said eyelet, and intermediate connecting sections connecting said eyelet and said hook to said anchor bend, said clip thereby exerting forces on said control members acting generally parallel to said second control member laterally extending portion.

References Cited in the file of this patent

UNITED STATES PATENTS

| | | |
|---|---|---|
| 1,142,979 | Pelton | June 15, 1915 |
| 1,558,731 | Withrow | Oct. 27, 1925 |
| 1,633,695 | Colley | June 28, 1927 |
| 1,896,456 | Moore | Feb. 7, 1933 |
| 2,365,520 | Boque | Dec. 19, 1944 |